United States Patent Office 3,383,185
Patented May 14, 1968

---

3,383,185
HYDRAZINE-NONABORANE COMPOUNDS AND SYNTHESIS THEREOF
William V. Hough, Gibsonia, and Gerald T. Hefferan, Butler, Pa., assignors, by mesne assignments, to the United States of America, as represented by the Secretary of the Navy
No Drawing. Filed Sept. 29, 1964, Ser. No. 400,289
4 Claims. (Cl. 23—358)

ABSTRACT OF THE DISCLOSURE

New high energy borane-hydrazine compounds which are useful for fuel additives and propellant ingredients simply prepared by reacting at room temperature dimethylsulfide-nonaborane with hydrazine or alkylhydrazine in an ether or hydrocarbon solvent.

---

This invention relates to novel borane-hydrazine compounds and to the synthesis thereof.

In the field of high energy fuels considerable interest has been exhibited in compounds containing boron, hydrogen, and nitrogen. The present invention is directed toward new high energy ingredients for application as fuel additives and as propellant ingredients.

It is an object of this invention to provide a high energy product for use in improving the physical characteristics of solid and liquid rocket propellants.

Another object is to provide an inexpensive process for synthesizing a new propellant ingredient.

A further object of this invention is to provide new compounds which are simple to produce and comparatively safe to handle.

Other objects, features and many of the attendant advantages of this invention will become readily appreciated as the same become better understood by reference to the following detailed description.

The new compounds of this invention are simply prepared by reacting at room temperature dimethylsulfide-nonaborane with hydrazine and alkylhydrazines such as methylhydrazine in an ether or hydrocarbon solvent. The product precipitated readily and after being filtered and dried was ready for use. The following examples will better illustrate the present invention and no unnecessary limitations are to be understood therefrom.

Example I

Two moles of hydrazine ($N_2H_4$) were added to one mole of dimethylsulfide-nonaborane (13) in an ether solvent at room temperature. A white hard product precipitated readily from the solution and was removed by filtration and vacuum dried. The reaction may be represented by the following equation:

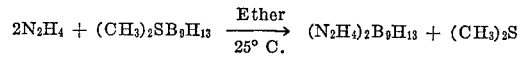

An elemental analysis calculated for $(N_2H_4)_2B_9H_{13}$ was as follows:
Calculated: Boron, 51.7; carbon, 0; hydrogen 120; nitrogen, 22.9. Found: Boron, 51.6; carbon, 2.8; hydrogen, 117.7; nitrogen 21.9.

Example II

Two moles of methyl hydrazine were added to one mole of dimethylsulfide-nonaborane (13) in an ether solvent at room temperature. A soft light yellow solid precipitated readily from the solution and was filtered, then vacuum dried. The reaction may be represented by the following equation:

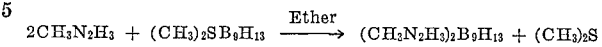

An elemental analysis of the product gave the following:
Calculated: Boron, 44.5; carbon, 9.9; hydrogen, 123; nitrogen, 19.8. Found: Boron, 44; carbon, 8.5; hydrogen, 113.7; nitrogen, 19.9.

Obviously many modifications and variations of the present invention are possible in the light of the above teachings. It is therefore to be understood that within the scope of the appended claims the invention may be practiced otherwise than as specifically described.

What is claimed is:

1. A process for the synthesis of bis(hydrazine) nonaborane (13) comprising
reacting at room temperature two moles of hydrazine with one mole of dimethylsulfide-nonaborane (13) in an inert reaction medium selected from the group consisting of ethers and hydrocarbons until a solid precipitate forms.

2. Bis-(hydrazine) nonaborane (13).

3. The process for the synthesis of bis(methylhydrazine)nonaborane (13) comprising
reacting at room temperature two moles of methylhydrazine with one mole of dimethylsulfide-nonaborane (13) in an inert reaction medium selected from the group consisting of ethers and hydrocarbons until a solid precipitate forms.

4. Bis-(methylhydrazine)nonaborane (13).

References Cited

UNITED STATES PATENTS 3,269,803   8/1966   Grafstein et al. _____ 23—358

OTHER REFERENCES

Graybill et al.: "Inorganic Chemistry," vol. I, pp. 626–631, (August 1962).

MILTON WEISSMAN, Primary Examiner.